(12) United States Patent
Pelkey, Jr. et al.

(10) Patent No.: US 9,854,897 B1
(45) Date of Patent: Jan. 2, 2018

(54) BACKPACK FOR ORGANIZING AND POWERING PERSONAL ELECTRONICS

(71) Applicant: The Gem Group, Inc., Lawrence, MA (US)

(72) Inventors: John W. Pelkey, Jr., Woburn, MA (US); Richard C. Bellofatto, Jr., Peabody, MA (US)

(73) Assignee: The Gem Group, Inc., Lawrence, MA (US)

( * ) Notice: Subject to any disclaimer, the term of this patent is extended or adjusted under 35 U.S.C. 154(b) by 0 days.

(21) Appl. No.: 14/992,687

(22) Filed: Jan. 11, 2016

Related U.S. Application Data (60) Provisional application No. 62/101,978, filed on Jan. 9, 2015.

(51) Int. Cl.
*A45F 3/04* (2006.01)
*H01M 2/02* (2006.01)
*A45F 3/00* (2006.01)

(52) U.S. Cl.
CPC ............ *A45F 3/04* (2013.01); *H01M 2/0202* (2013.01); *A45F 2003/003* (2013.01); *A45F 2200/0508* (2013.01); *A45F 2200/0516* (2013.01); *A45F 2200/0525* (2013.01); *H01M 2002/0205* (2013.01)

(58) Field of Classification Search
CPC ............... A45F 3/04; A45F 2200/0508; A45F 2200/0516; A45F 2200/0525; Y10S 224/902; Y10S 224/93
USPC ......................................... 224/645, 653, 647
See application file for complete search history.

(56) References Cited

U.S. PATENT DOCUMENTS 2,676,738 A * 4/1954 Herrick ..................... A45F 3/14
  224/249
4,411,267 A * 10/1983 Heyman .............. A61B 5/0006
  224/663

(Continued)

OTHER PUBLICATIONS

TYLT, "Built to TYLT", 2015, Publisher: TYLT.com, Published in: US.

(Continued)

*Primary Examiner* — Justin Larson
(74) *Attorney, Agent, or Firm* — Loginov & Associates; William A. Loginov (57) ABSTRACT

This invention provides a backpack with a compartment containing a plurality of pockets for carrying personal electronic devices, including a specific pocket for storing a rechargeable battery pack within a range of sizes, shapes and cable socket number/placement on the pack's housing. The battery pocket defines crossing bands of elastic that accommodates/secures various battery form factors. Power cable access to sockets on the pack is eased by the flexibility of the straps and their interstices. The main compartment includes pockets for other electronic items, such as a tablet computer, smartphone and/or music player. Pockets are constructed from a mesh that includes an elastomer coating for frictional retention of items. A cable pocket, including pass through openings is also provided to route and store gathered/wound sections of power cables from the battery pack located therebelow. Cables extend from the cable pocket to various electronic devices in adjacent pockets, or externally.

12 Claims, 8 Drawing Sheets

(56) References Cited

U.S. PATENT DOCUMENTS

| | | | | |
|---|---|---|---|---|
| 5,024,360 A * | 6/1991 | Rodriguez | A41D 13/0012 | 2/102 |
| 5,160,001 A * | 11/1992 | Marceau | A45C 3/02 | 190/102 |
| 5,211,321 A * | 5/1993 | Rodriguez | A41D 13/0012 | 2/102 |
| 5,409,152 A * | 4/1995 | Trevino | A45C 15/00 | 224/259 |
| 5,611,085 A * | 3/1997 | Rasmussen | A41D 13/1245 | 2/102 |
| D382,166 S * | 8/1997 | Alves | D3/301 | |
| D390,352 S * | 2/1998 | Lane | D3/216 | |
| 5,758,809 A * | 6/1998 | Bonner | A45F 3/14 | 224/259 |
| 5,776,105 A * | 7/1998 | Corn | A61M 5/1483 | 604/174 |
| 5,808,865 A * | 9/1998 | Alves | G06F 1/1628 | 206/305 |
| 5,915,609 A * | 6/1999 | Diakoulas | A45F 3/14 | 224/625 |
| D426,937 S * | 6/2000 | Auster | D2/829 | |
| 6,260,202 B1 * | 7/2001 | Villalobos | G21F 3/02 | 2/102 |
| 6,345,751 B1 * | 2/2002 | Elliot | A45F 3/04 | 224/640 |
| 6,434,032 B1 * | 8/2002 | Romano | H02J 7/0045 | 320/113 |
| 6,443,347 B1 * | 9/2002 | Elizalde | A45F 3/14 | 224/245 |
| 6,655,565 B2 * | 12/2003 | Godshaw | A45F 3/04 | 224/576 |
| 6,659,320 B1 * | 12/2003 | Alves | A45C 7/0086 | 224/581 |
| 6,712,249 B2 * | 3/2004 | Magnusson | H04R 5/023 | 224/153 |
| 6,712,567 B2 * | 3/2004 | Hsu | B60P 7/0815 | 410/35 |
| D500,920 S * | 1/2005 | Koenig | D3/216 | |
| 6,870,089 B1 * | 3/2005 | Gray | H01L 31/042 | 136/200 |
| 6,883,693 B2 * | 4/2005 | Han | A45C 13/36 | 224/245 |
| 6,889,883 B2 * | 5/2005 | Nykoluk | A45C 13/00 | 206/320 |
| 6,894,457 B2 * | 5/2005 | Germagian | H02M 7/003 | 320/119 |
| 6,962,277 B2 * | 11/2005 | Quintana | A45F 3/14 | 224/262 |
| 7,177,420 B2 * | 2/2007 | Carter | G11B 33/025 | 224/153 |
| 7,198,512 B1 * | 4/2007 | Swiatek | B62J 9/008 | 224/902 |
| 7,619,884 B1 * | 11/2009 | Gray | G06F 1/26 | 136/251 |
| 8,141,174 B2 * | 3/2012 | Golle | A41D 1/04 | 2/69 |
| 8,152,001 B1 * | 4/2012 | Vinklarek | A47L 15/505 | 211/180 |
| 8,593,108 B2 * | 11/2013 | Ferber | H02J 7/0044 | 320/114 |
| 8,608,041 B1 * | 12/2013 | Adkisson | A45F 5/00 | 2/102 |
| 8,890,478 B2 * | 11/2014 | Matthias | B25H 3/006 | 320/114 |
| 9,089,198 B1 * | 7/2015 | Devereaux | A45F 5/022 | |
| 9,144,281 B2 * | 9/2015 | Cross | A45C 5/14 | |
| 9,210,976 B2 * | 12/2015 | Maeda | A45C 11/00 | |
| 2004/0085043 A1 * | 5/2004 | Germagian | H02J 7/0042 | 320/107 |
| 2005/0230445 A1 * | 10/2005 | Woo | A45C 15/00 | 224/576 |
| 2006/0118376 A1 * | 6/2006 | Godshaw | A01K 1/0254 | 190/107 |
| 2006/0163303 A1 * | 7/2006 | Trutanich | A45F 3/04 | 224/576 |
| 2007/0045369 A1 * | 3/2007 | Chen | A45F 3/04 | 224/576 |
| 2007/0210129 A1 * | 9/2007 | Feng | A45F 3/04 | 224/576 |
| 2008/0237288 A1 * | 10/2008 | Hamilton | A45C 13/18 | 224/645 |
| 2009/0039122 A1 * | 2/2009 | Antonioni | A45C 13/02 | 224/250 |
| 2009/0224722 A1 * | 9/2009 | Causey | H02J 7/355 | 320/101 |
| 2010/0231161 A1 * | 9/2010 | Brown | B25H 3/02 | 320/101 |
| 2011/0006729 A1 * | 1/2011 | Matthias | B25H 3/006 | 320/107 |
| 2012/0043937 A1 * | 2/2012 | Williams | H02J 7/0044 | 320/115 |
| 2012/0262117 A1 * | 10/2012 | Ferber | H02J 7/0047 | 320/111 |
| 2014/0001079 A1 * | 1/2014 | Green | A45C 13/02 | 206/577 |
| 2016/0040958 A1 * | 2/2016 | Alcantra | A41D 3/00 | 224/182 |

OTHER PUBLICATIONS

Cocoon Innovations, "Cocoon Grid-It", 2009, Publisher: DMC Capital Funding Portfolio Company, Published in: US.

* cited by examiner

BACKPACK FOR ORGANIZING AND POWERING PERSONAL ELECTRONICS

RELATED APPLICATION

This application claims the benefit of U.S. Provisional Application No. 62/101,978, entitled BACKPACK FOR ORGANIZING AND POWERING PERSONAL ELECTRONICS, filed Jan. 9, 2015, the teachings of which are incorporated herein by reference.

FIELD OF THE INVENTION

This invention relates to bags and backpacks for carrying personal effects, and more particularly to backpacks adapted to carry personal electronics.

BACKGROUND OF THE INVENTION

Bags and backpacks are a ubiquitous part of daily life in personal, scholastic, and business endeavors. They are used to carry books, personal effects and documents during transit on foot, bicycle, vehicle, and all forms of public transportation, and have become a vital hub in a person's activities. As bags and backpacks have taken on more roles they have also become more versatile, often providing specialized pockets and wire chase for music players, headphones, smartphones, tablets and laptop computers, so as to avoid mingling such items with the clutter of a main storage compartment.

Since such bags and backpacks now serve as electronic hubs, the ability to power such items becomes more desirable. The advent of USB-based charging ports provided in various venues, such as airports, terminals and restaurants, as well as power strips, has provided a relatively safe, standardized, low-voltage solution for charging a wide range of electronics. This enhances the ability to provide an integrated power solution for bags and backpacks. However, many powered items and power sources (e.g. USB-rechargeable battery units) are provided in a wide range of form factors, and integrating them into a bag or backpack requires specific pocket designs that can outlive the current technology and render a bag quickly obsolete or, at best, inconvenient to use over the long term.

SUMMARY OF THE INVENTION

This invention overcomes disadvantages of the prior art by providing a backpack or similar bag with a main compartment containing a plurality of pockets for carrying personal electronic devices, including a specific pocket for storing a rechargeable battery pack within a range of sizes, shapes and cable socket number/placement on the pack's housing. The battery pocket is constructed of crossing bands of elastic webbing within a perimeter that is sized and arranged to accommodate, and to secure-in-place, a wide range of commercially available battery pack form factors. Power cable access to sockets on the pack is eased by the flexibility of the straps and the interstitial openings provided between them. The main storage compartment also includes additional pockets, with and without (free-of) zippered or snapped closures that are sized for other electronic items, such as a tablet computer, smartphone (e.g. Apple iPhone®, Samsung Galaxy, Motorola Droid® etc.) and/or music player (e.g. Apple iPod®). Pockets can be constructed from a mesh material that includes an elastomer coating for frictional retention of such electronics. A cable pocket, including pass through openings is also provided to route and store gathered/wound sections of power cables from the battery pack located therebelow. Cables extend from the cable pocket to various electronic devices stored in adjacent pockets, or external to the storage compartment. A pass-through is provided for routing a cable (e.g. a USB charging cable) from the storage compartment adjacent the battery pack (e.g. near the bottom of the compartment and additional pass throughs can be provided near the top of the storage compartment. One pass through can be used to route a charging cable from the cable pocket to a pocket on a back strap that can contain a smartphone/music player and another pass through can be used to route headphone cables from the storage compartment to a user when the smartphone/music player resides within the storage compartment.

In an illustrative embodiment, a backpack for organizing and powering personal electronic devices comprises an inner storage compartment having a battery pack pocket defining a plurality of crossing elastic strips. The strips are constructed and arranged to allow a battery pack within a predetermined range of sizes and shapes to pass between the strips and to be secured by the strips, with a power cord and a charging cord exiting between the strips from the pocket. Illustratively, the battery pack pocket is located on a pocket panel assembly that includes a plurality of pockets to which cables are guided from the battery pack pocket. The pocket panel assembly includes a slot for storing a laptop or tablet and a cable pocket adjacent to the battery pack pocket having a cutout for receiving a cable therethrough from the battery pack. The cable pocket can define a mesh material and includes two compartments with respective cutouts. The pocket panel assembly can also include a device pocket for receiving a smartphone or music player, and the device pocket can be constructed from a mesh material. The backpack can include pass throughs that allow cables to extend from the inner compartment to the exterior, and one of the pass throughs can be located adjacent to the battery pack pocket to allow a battery pack charging cable to extend therefrom. Additionally, one of the pass throughs can be located adjacent to a top of the backpack and routes a device power cable from the battery pack to a location along a shoulder strap. The shoulder strap can include a device pocket for receiving a personal electronic device with the device power cable connected thereto and hold downs for the device power cable between the respective pass through and the device pocket.

BRIEF DESCRIPTION OF THE DRAWINGS

The invention description below refers to the accompanying drawings, of which.

DETAILED DESCRIPTION

FIGS. 1-4 show a backpack 100 for organizing and powering personal electronic devices according to an illustrative embodiment. The backpack is shown with main flap 110 closed in FIGS. 1 and 3, and with main flap 110 open to reveal the main storage compartment 210 in FIGS. 2 and 4. The backpack can be constructed from a variety of materials, both synthetic and natural, as well as a combination of materials. For example, padded nylon fabric can be used. As shown a variety of design enhancements, such as quilting 112 and colored bands 114 and 116 can be provided. In this embodiment, the main flap 110 and subsidiary compartments are secured by one or more zipper closures 120. Additional pockets constructed from a commercially available mesh material or another fabric can also be provided, for example, along one or both sides of the backpack 100. The backpack 100 can also include a conventional handle 130 for ease of hand-carriage. The bottom of the backpack 100 can include reinforcing fabric 140, and optionally, an internal stiffener (not shown) to maintain the shape of the backpack. Likewise additional padding (e.g. foam, plastic sheet, etc.—not shown) can be placed at various locations between fabric layers, such as at the rear surface 220 of the main storage compartment 210. This padding can aid in cushioning the rear surface 220 and stored contents of the main compartment from the user's back and can be conventional.

Figure 1:
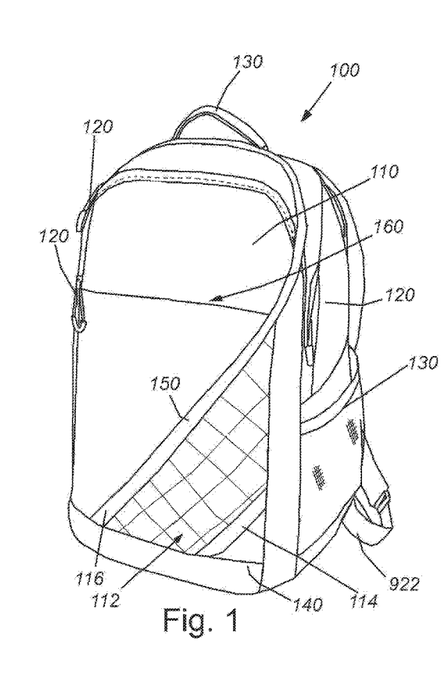
FIG. 1 is a perspective view of a backpack for organizing and powering electronic devices according to an illustrative embodiment.
Figure 2:
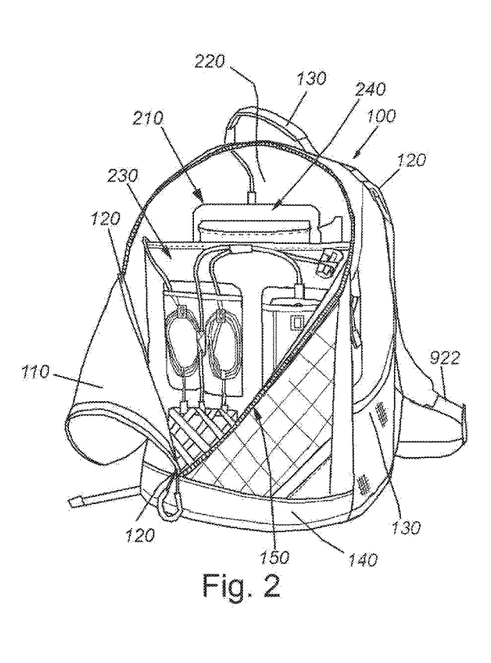
FIG. 2 is a perspective view of the backpack of FIG. 1 shown with the main storage compartment exposed to reveal various pockets for retaining and organizing personal electronic devices, cables and a rechargeable battery pack.
Figure 3:
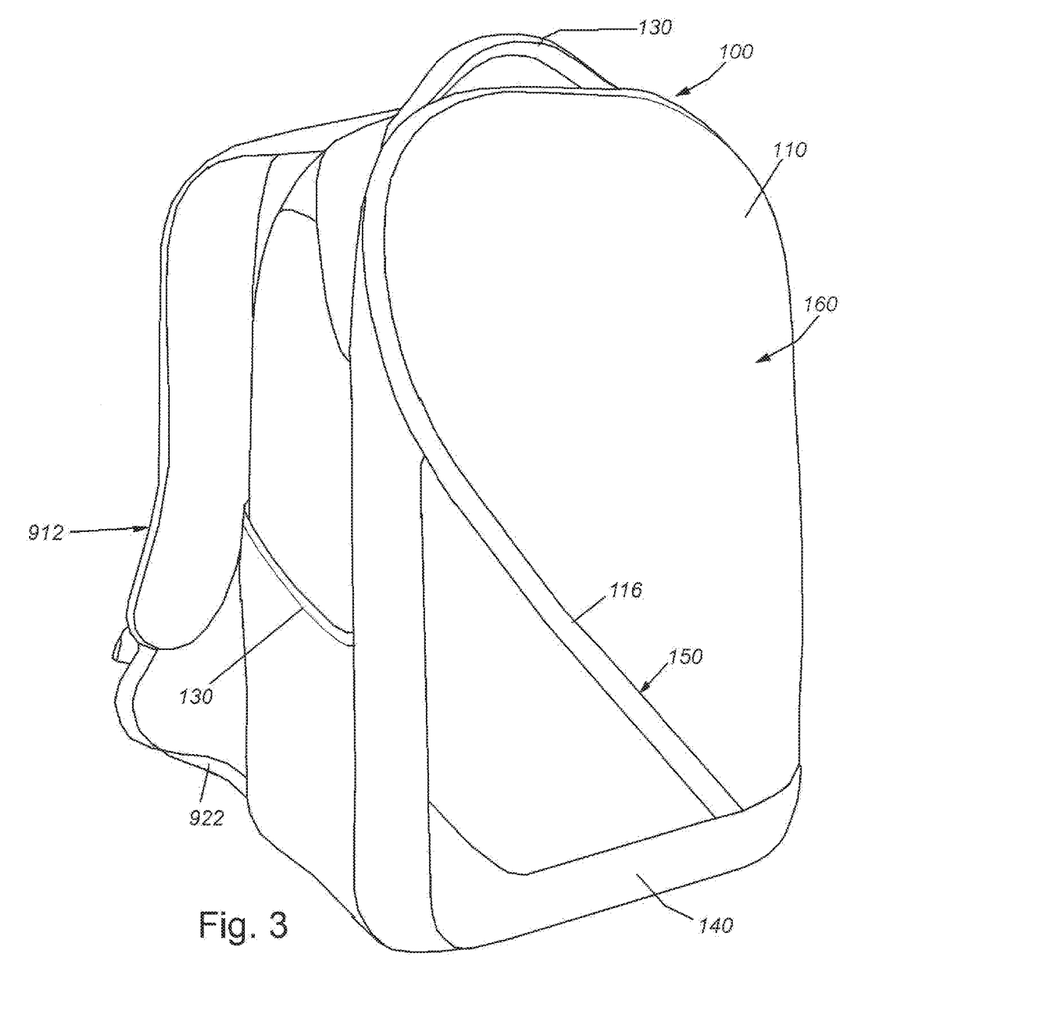
FIG. 3 is a further front perspective view of the backpack of FIG. 1.
Figure 4:
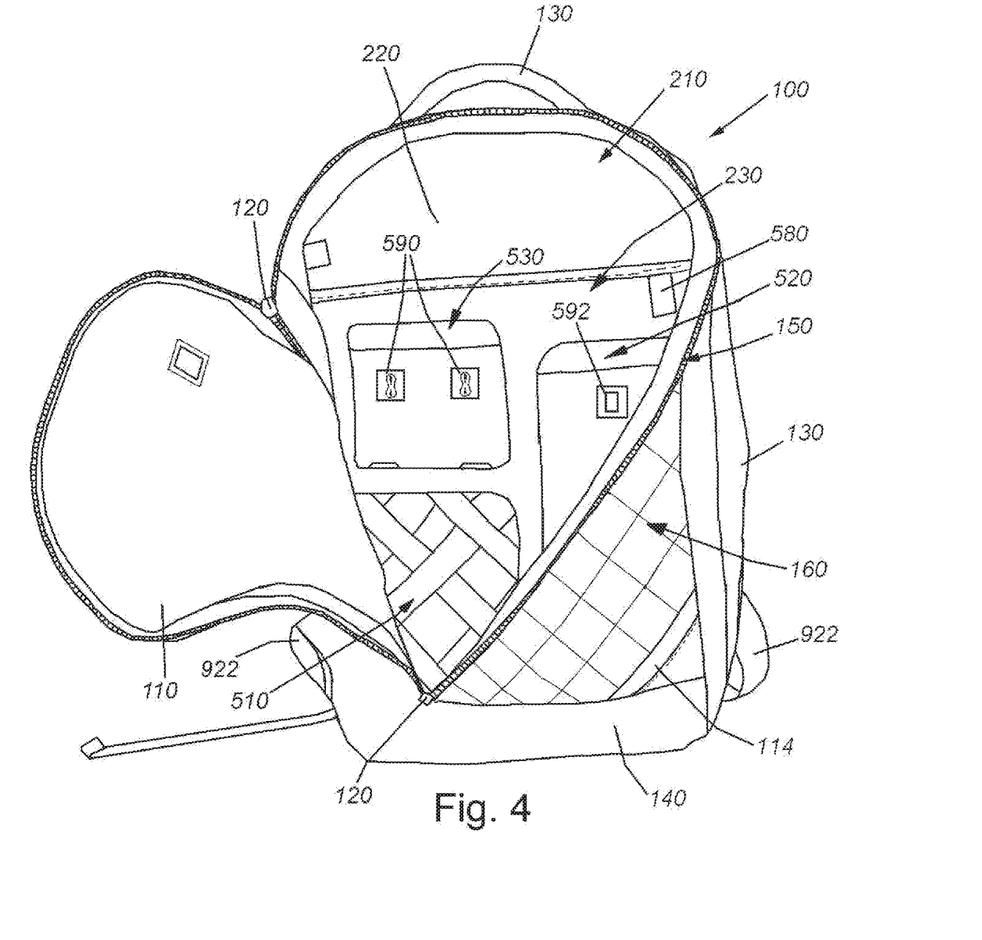
FIG. 4 is a frontal view of the backpack of FIG. 1 with main flap open to reveal the main compartment and electronic device storage pockets.
Figure 5:
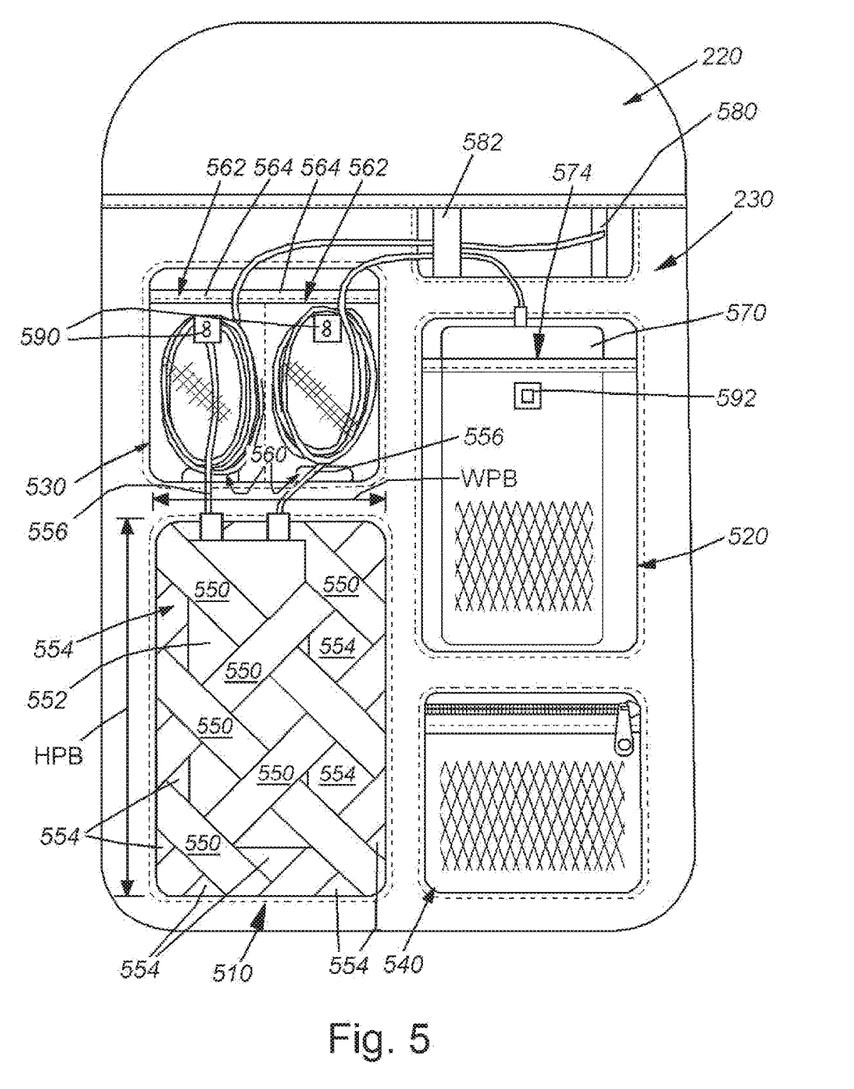
FIG. 5 is a diagram showing the layout of electronic device storage pockets on the surface of the main storage compartment of the backpack of FIG. 1.

The main flap 110 opens to the side as shown with a zipper seam 150 that crosses diagonally across a portion of the backpack's front face 160 so as to provide a partially covered (by the (e.g.) quilted area 112) main compartment 210 when the flap 110 is fully opened. The rear surface 220 supports a pocket assembly or layer 230 that allows a tablet 240 or laptop to be stored between the pocket assembly 230 and the rear surface 220. With further reference to FIG. 5, the pocket assembly/layer 230 includes four pockets (for example) 510, 520, 530 and 540. The bottom left pocket 510 is defined as a series of ½-¾-inch wide elastic webbing strips 550 that cross at (approximately) right angles (although the angle of cross can vary). The strips 550 are free of stitches or interconnections therebetween, so that they can stretch and slide freely with respect to each other. They are anchored at their ends by stitching and are interwoven as shown to provide a more cohesive overall mesh. Illustratively the pocket 510 and can be optionally coated with a friction-producing elastomer that should be clear to those of skill. The size and outline shape of the pocket is highly variable. In this embodiment, it has a rectangular height HPB of between 5 and 6 inches and a rectangular width WPB of between 3 and 4 inches. This dimension is sufficient to receive and secure a wide range of commercially available, USB-based battery packs 552.

Operationally, the depicted, exemplary pack 552 is secured as shown beneath the strips 550 by passing it through the diamond-shaped slots 554 (that are between approximately ½ and 1¼ inch square), so that it as elastically compressed between the strips 550 and the base material of the pocket assembly/layer 230. The slots 554 allow for cords 556 to pass from the pocket 550 to other locations within and external of the main compartment 210.

Figure 6:
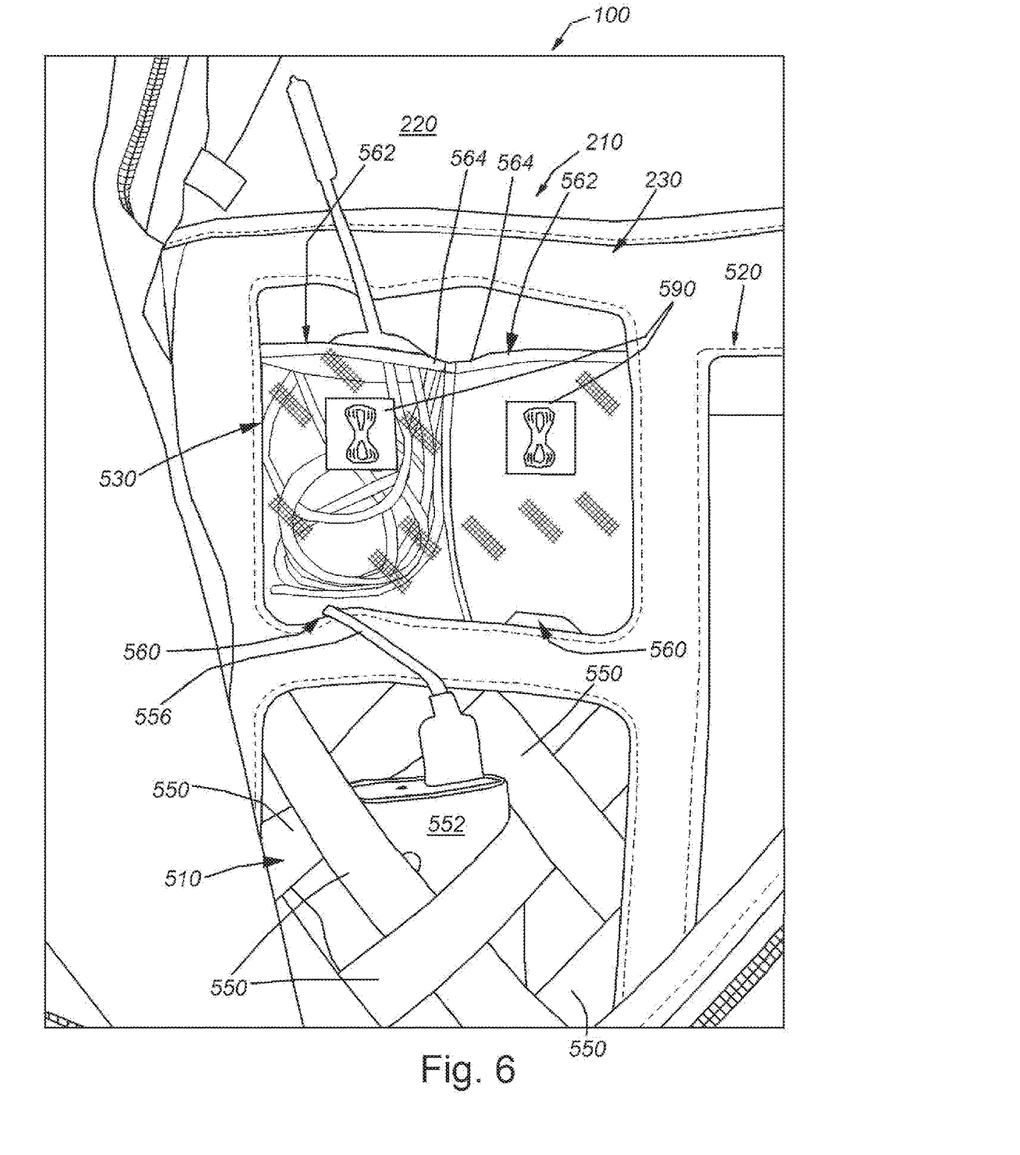
FIG. 6 is more detailed frontal view of the battery pack and cable storage pockets on the surface of the main storage compartment of the backpack of FIG. 1.

With reference also to FIG. 6, the cords/cables 556 extend into a cord/cable-organizing pocket 530. The cords/cables 556 pass through cutouts 560 in the bottom of the pocket material, which in this embodiment is a fine mesh with an (optional) elastomeric coating that assists in retaining the cords/cables in the pocket. In this embodiment, the pocket 530 is divided into two compartments 562. Cords/cables 556 are inserted in bundled/coiled form as shown in the compartment 562 through a top opening 564 (openings can be placed along another edge), with one lead passing through the respective cutout 560 to an associated socket of the battery pack 552 or another device. The opposing lead of the cord/cable extends out of the top opening 564 to a device within the compartment 210 (e.g. the tablet 240 or a smartphone/music player 570 stored within the pocket 520), or to an external device. The pocket 520 is constructed from a fine mesh with an optional elastomeric coating. The pocket defines an open top 574 through which the phone (or other device) is inserted and removed, and from which a cord/cable exists, as shown. It is sized to accommodate various form factors of phone/music player.

Figure 7:
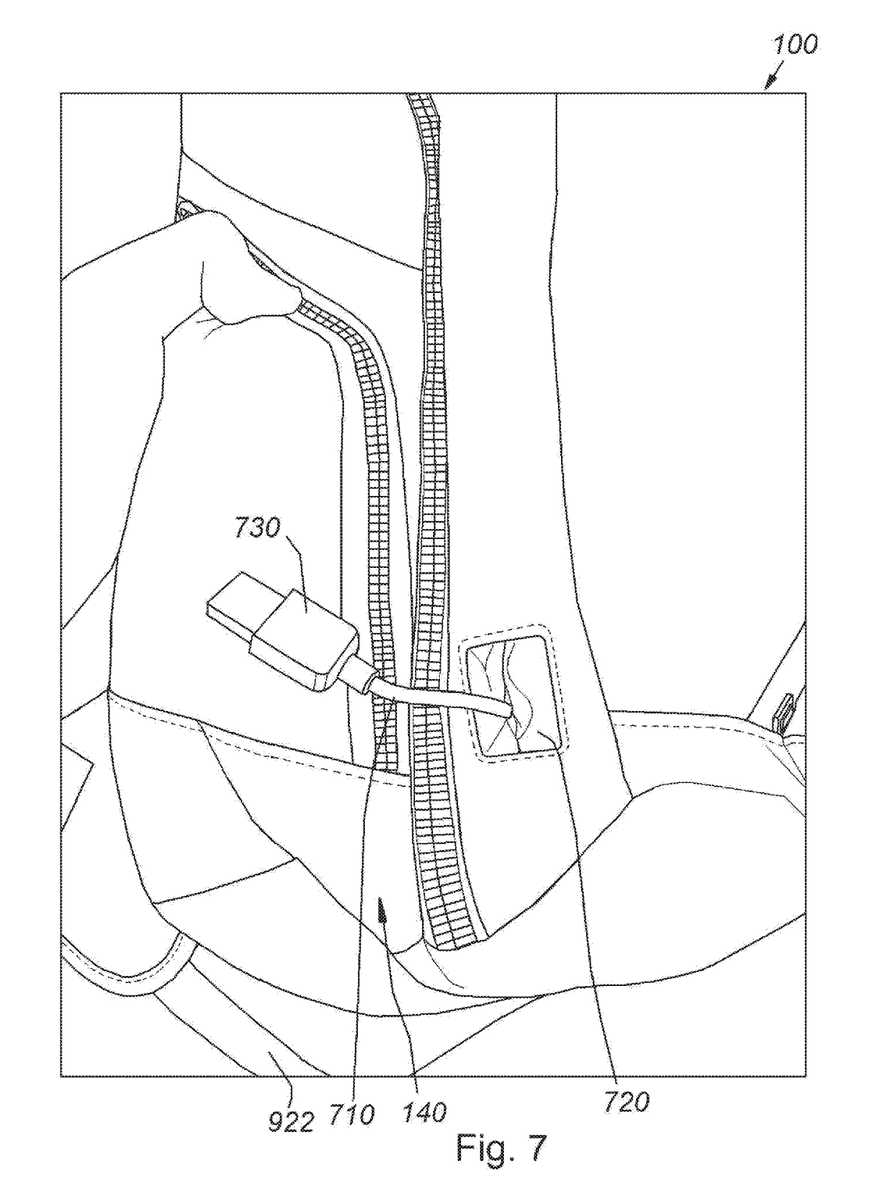
FIG. 7 is a partial side view of a pass through for a battery pack charging cable for the backpack of FIG. 1.

Referring to FIG. 7, the charging cord 710 for the battery pack 552 extends to the exterior through a pass through (slit gusset) 720 that is sized and arranged to allow the end of the USB plug 730 to clear the slot. The gusset 720 is located near the battery pack 552 at the base of the backpack 100. It can be located within the pocket 510 or adjacent to it on the rear or side wall of the backpack.

Figure 8:
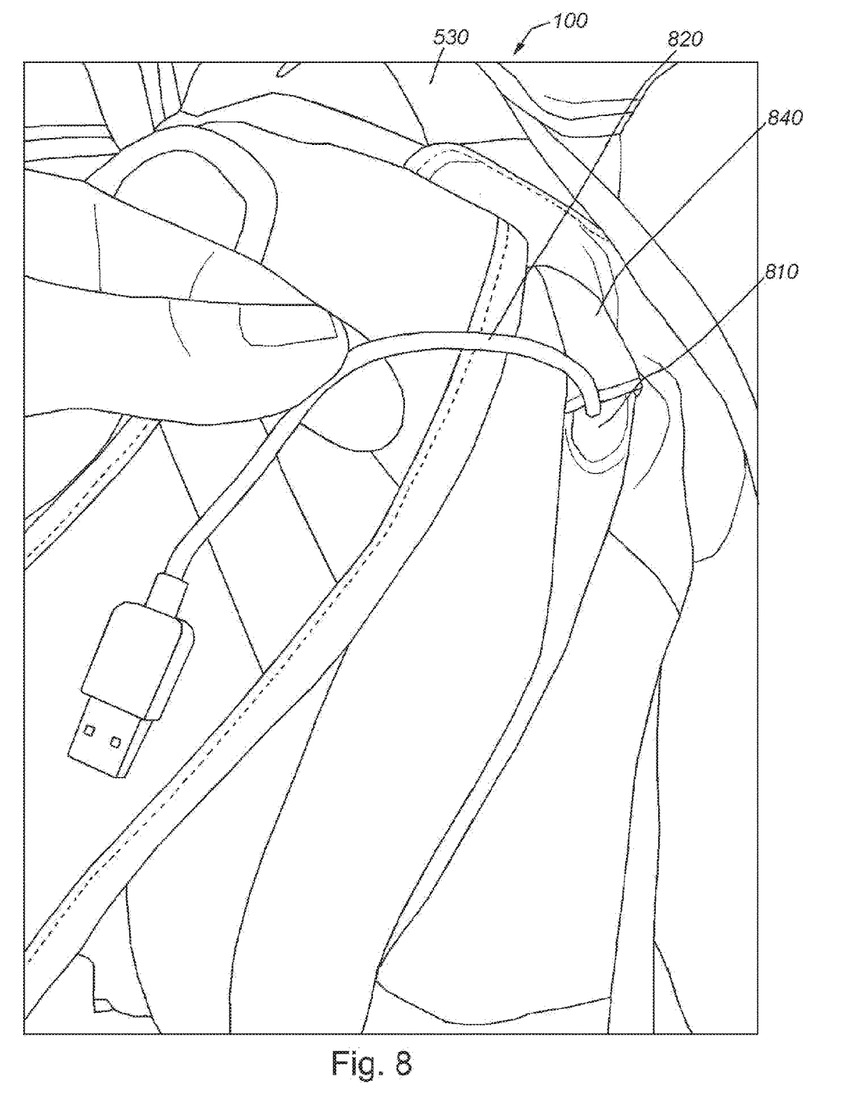
FIG. 8 is a partial side view of a pass through for an electronic device power cable.

Cables are routed to an external device through an appropriate pass through (e.g. a slot gusset 580) on the rear surface 220. An elastic hold-down 582 can be provided near the gusset 580. In an embodiment, gussets are located on both top sides of the backpack 100 to provide a pass through from the main compartment 210 to the exterior. The exit 810 of the opposing gusset 580 is shown in FIG. 8, where a cable 820 exits to the exterior of the backpack 100. This cable can be a headphone cable connected to an internally stored phone/music player (e.g. phone 570 in FIG. 5 in pocket 520).

One or more of the gussets 580, 720, etc., can be replaced with a flexible grommet, such as a round, flexible, plastic grommet with a central hole and a series of radial slits. Referring to FIG. 5, an additional zippered pocket 540 is located on the pocket assembly/layer 230 and can be constructed from mesh or another fabric. It can be used for items that are desirably stored in a sealed pocket. Note that more or fewer pockets can be provided in alternate embodiments, and such pockets can be sized and arranged for storage of various devices or other items—such as a drivers license, passport, identification card, change, credit cards, keys, etc.

Figure 9:
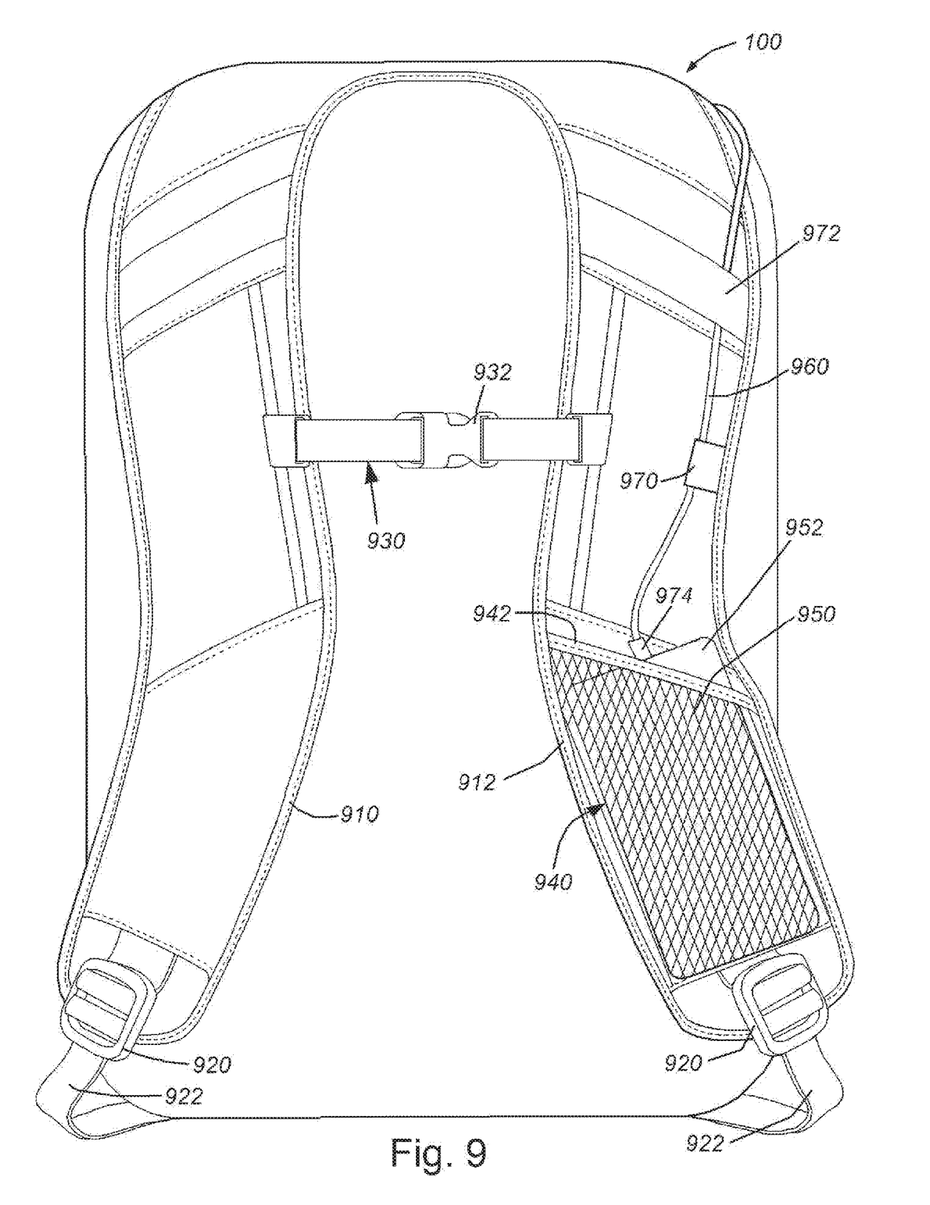
FIG. 9 is a rear view of the backpack of FIG. 1 showing the back straps and a strap-mounted pouch containing an exemplary electronic device with power cord guided along the strap.

Reference is made to FIG. 9, which shows the rear of the backpack 100, including the shoulder straps 910 and 912. The shoulder straps 910, 912 are padded and include adjustment buckles 920 on web end straps 922 according to a conventional arrangement. A conventional cross strap assembly 930 with buckle 932 is also provided. The strap 912 includes a mesh pocket 940 with optional elastomeric coating. The pocket 940 is accessed by a sloped top opening 942 and is sized in width and height to conform to the size\/shape of a given electronic device (e.g. a smartphone/music player such as the Apple iPhone®/iPod®) 950. The pocket opening 942 is adapted to expose a corner 952 of an average sized device so it can be removed easily. As shown, a charging cable 960 is guided along the outer face of the strap 912 as shown from a gusset on the side of the backpack (described above). A guiding loop 970 of material is provided a few inches from the pocket 940 and an elastic hold-down strap 972 is provided above the loop 972 spaced a few inches therefrom. Additional loops or straps can be employed, and the depicted loops can be replaced with straps and vice versa. Alternate hold-down arrangements including a mesh or fabric tube on the strap surface can be employed in alternate embodiments. The loop 970 should be sufficient in size to allow pass-through of a plug end 974. By way of example, the plug end can be a micro or mini USB or an Apple Lightning® connector. Other form factors can also be accommodated. The pocket 940 and cord-guiding arrangement of the shoulder strap 912 allows a user to keep his or her device (950) accessible, yet secure and to charge it from the battery pack (552). Alternatively, the device pocket can be provided on the opposing strap 910 or on both straps. An additional pocket, such as a headphone pocket can be provided on the opposing strap 910.

Illustratively, various locations on the strap can include indica describing the particular function of the component. For example, cable indica 590 can be provided on the cable compartments 562. A phone indicia 592 can be provided on the phone pocket 520. A power cable indicia 840 can be provide near the top gusset 810 (FIG. 8). Other indicia are expressly contemplated.

While the USB standard is used to deliver power in this embodiment, it is expressly contemplated that other standard or proprietary protocols can be employed—for example 12 VAC or DC. Optionally/alternatively, the pocket, or another location on the backpack 100, can be adapted to store a wall current power adapter/transformer.

It should be clear that the backpack described herein allows a user to select an appropriate battery pack without the constraints of a predefined pocket shape. The pack is secured, yet removable and accessible, reducing the possibility that it will shift and suffer damage (or damage other items) in use. Other devices are well-organized and cords are neatly routed therebetween. Charging of the battery pack is straightforward, and can be accomplished without (free of) opening or accessing the main storage compartment or any other sealed compartment by passing a cord/cable through a bottom pass through (gusset).

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Likewise, the arrangement of pockets, zippers, flaps, as well as the placement of pockets, pass throughs and the like can be widely varied. Additional internal pockets and/or compartments can also be provided as appropriate and the outline shape of the backpack is highly variable. Also, the strips and/or other locations on the backpack can be color-coded to assist in organizing items and devices. Accordingly, this description is meant to be taken only by way of example, and not to otherwise limit the scope of this invention.

What is claimed is:

1. A backpack for organizing and powering personal electronic devices comprising:
   an inner storage compartment having a battery pack pocket;
   a zipper that allows access from an exterior of the backpack to the inner storage compartment when the zipper is in an open configuration;
   at least one pass through that allows cables to extend from the inner compartment to the exterior of the backpack when the zipper is in a closed configuration; and
   a planar pocket panel assembly defining a single plane, the pocket panel assembly having a plurality of panel features attached to the pocket panel assembly, the plurality of panel features comprising:
      at least one cable pocket to which cables are guided from the battery pack pocket, the at least one pocket having a first opening at the top of the pocket configured to receive a bundled cable, and a second opening at the bottom of the pocket configured to allow a strand of cable to extend through the second opening, the second opening being sized to prevent the bundled cable from falling through the second opening;
      a device pocket configured to hold an electronic device; and
      a cable containment strap located higher on the pocket panel assembly than the at least one cable pocket and the device pocket, wherein the plurality of panel features are arranged in a single plane.

2. The backpack as set forth in claim 1 wherein the pocket panel assembly includes a slot for storing a laptop or tablet.

3. The backpack as set forth in claim 1 wherein the pocket panel assembly includes a cable pocket adjacent to the battery pack pocket having a cutout for receiving a cable therethrough from the battery pack.

4. The backpack as set forth in claim 3 wherein the cable pocket defines a mesh material and includes two compartments with respective cutouts.

5. The backpack as set forth in claim 3 wherein the pocket panel assembly includes a device pocket for receiving a smartphone or music player.

6. The backpack as set forth in claim 5 wherein the device pocket is constructed from a mesh material.

7. The backpack as set forth in claim 1 wherein one of the at least one pass throughs is located adjacent to the battery pack pocket to allow a battery pack charging cable to extend therefrom.

8. The backpack as set forth in claim 1 wherein one of the at least one pass throughs is located adjacent to a top of the backpack and routes a device power cable from the battery pack to a location along a shoulder strap.

9. The backpack as set forth in claim 8 wherein the shoulder strap includes a device pocket for receiving a personal electronic device with the device power cable connected thereto.

10. The backpack as set forth in claim 9 wherein the shoulder strap includes hold downs for the device power cable between the respective one of the pass throughs and the device pocket.

11. The backpack as set forth in claim 1, wherein the at least one pass through is a grommet.

12. The backpack as set forth in claim 1, wherein the at least one pass through is a slit gusset.

\* \* \* \* \*